United States Patent [19]

Jezowski

[11] 3,961,557
[45] June 8, 1976

[54] QUICK-LOCKING MACHINE STOP
[75] Inventor: Randolph M. Jezowski, Lynn, Mass.
[73] Assignee: Signet Tool and Engineering, Inc., Saugus, Mass.
[22] Filed: June 16, 1975
[21] Appl. No.: 587,252

[52] U.S. Cl. ............................. 90/11 E; 82/34 A; 90/DIG. 12
[51] Int. Cl.² ................................. B23Q 3/18
[58] Field of Search .............. 29/65; 90/58 R, 11 E, 90/DIG. 12; 83/467, 468, 438, 444; 51/268, 269, 272; 82/34 R, 34 A, 34 B; 269/297–306, 315–320; 408/87, 89, 90, 241, 710

[56] References Cited
UNITED STATES PATENTS

| 549,396 | 11/1895 | Sanborn | 82/34 R |
| 1,158,127 | 10/1915 | Geiger | 51/269 |
| 3,126,044 | 3/1964 | Riso | 269/305 |
| 3,689,168 | 9/1972 | Persson | 408/241 G X |

Primary Examiner—J. M. Meister
Assistant Examiner—Fred A. Silverberg
Attorney, Agent, or Firm—Robert A. Cesari; John F. McKenna; Andrew F. Kehoe

[57] ABSTRACT

A quick-fastening and compact machine stop of the type used to aid machine operators in positioning of work on machine tools for precision machining operations. The novel machine stop is characterized by a biased neutral adjust mode and a screw-advanced cam surface which engages another cam at an angle to achieve a locking mode in which a plurality of clamp-effecting force vectors are achieved.

6 Claims, 8 Drawing Figures

QUICK-LOCKING MACHINE STOP

BACKGROUND OF THE INVENTION

Precision machine stops, or "work stops" as they are sometimes called, are well known in the art. Normally such devices are mounted on the table of the lathe or milling machine. Various independent positioning adjustments are made to movable members. Then the members are locked in place to provide whatever stop limits are involved in travel of a workpiece during a machining process. The independent adjustments are usually made using a plurality of tools such as Allen wrenches and screwdrivers. This is a time-consuming procedure; moreover, screw-type locking interfaces of the type commonly used are inevitably worn, e.g. gouged and nicked, during use over a period of time. This wear makes tightening and, consequently, secure positioning of a stop less a reliable operation.

Thus, there has been a need for a more convenient and dependable work stop apparatus.

SUMMARY OF THE INVENTION

It is an object of the present invention to provide a novel work stop which can be readily adjusted to provide stop means which is readily and conveniently adjustable into secure pre-selected positions, all of which positions then can be locked with a single locking action, e.g. a turn of the wrist.

Another object of the invention is to provide a work stop of the type described above which is of economical construction and has an improved service life.

Another object of the invention is to provide a novel combined work stop which also has important utility as a work support and as a means for positioning auxiliary apparatus such as an eye shield, coolant nozzle, or the like.

Still another object of the invention is to provide a work stop that is free of compressive mechanical interfaces wherein a screw end, or other such means, is used to support a mass acting vertical to the axis of the force vector exerted by, e.g., the screw.

Other objects of the invention will be obvious to those skilled in the art on reading this disclosure.

The above objects have been achieved by providing a novel work-stop apparatus which comprises (1) a simple biasing means made effective, by a vector-changing cam assembly, to hold all parts of the apparatus in snug, independently-adjustable relationship while the device is in an adjust mode, and (2) a tightening means, for overriding the biasing means, and placing all parts of said apparatus in a lock mode whereby the same cam assembly is used to transmit locking pressure to a work-stop member mounted at a 90° angle to the tightening means. In the preferred embodiment of the invention, tightening is achieved by pulling a postlocking member in one direction with a locking screw while pushing one cam into contact with another cam, thereby displacing the second cam into a locking mode.

IN THE DRAWINGS

This invention is pointed out with particularity in the appended claims. The foregoing and other features and advantages of the invention will be better understood from the following detailed description taken in conjunction with the accompanying drawings.

Figure 1:
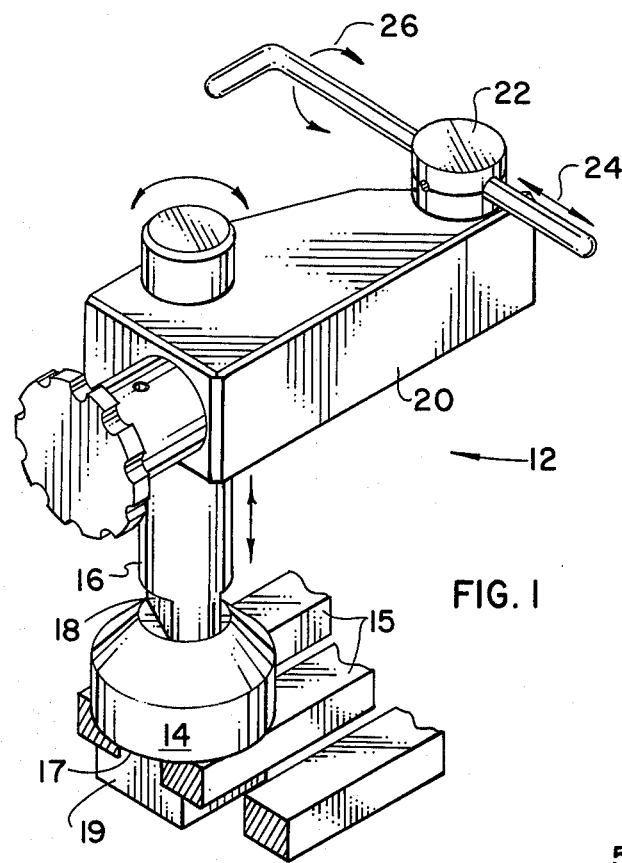
FIG. 1 is a perspective diagrammatic view of an apparatus constructed according to the invention.

Referring to FIG. 1, it is seen that work stop apparatus 12 comprises a base member 14 adapted for clamping the apparatus to the bed of a machine tool. Typically, the base 14 will fit beneath slats 15 in the bed and work post 16 will be tightened against the bed by use of wrench flats 18, thereby tightening base 17 against T-nut 19. (See FIG. 1) A housing 20 is mounted on post 16. Housing 20 is adapted to swing about post 16 or to slide up and down thereon. Mounted on housing 20 is a second clamp means, a vertical clamp 22, which is adapted for clamping L-shaped rod 24 in a horizontal plane. Rod 24 is adapted for slideable movement along rod 24 and within clamp 22 and for rotary movement therein as seen at 26.

As shown in FIG. 1, there are 5 independent positioning features of the apparatus.

When the disclosed apparatus is being set up prior to a machining operation, it is in what we shall call an "adjust mode". It is a particularly advantageous feature of the adjust mode that all of the above-described relative positioning movements possible between post 16 and housing 20 or clamp 22 and rod 24 be independently and easily achieved without slippage from the desired adjustment. It is another feature of the apparatus that all said relative positioning, upon completion of the adjust mode, be converted into locked positions by use of a single lock-actuating means.

Figure 3:
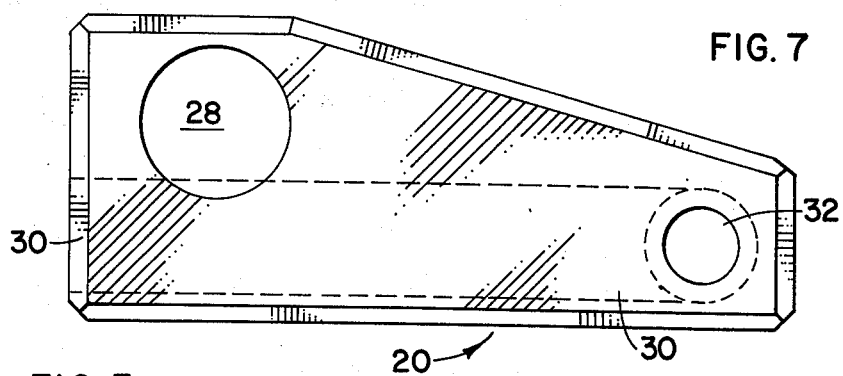
FIG. 3 is a plan view of a housing used in the illustrated apparatus.
Figure 2:
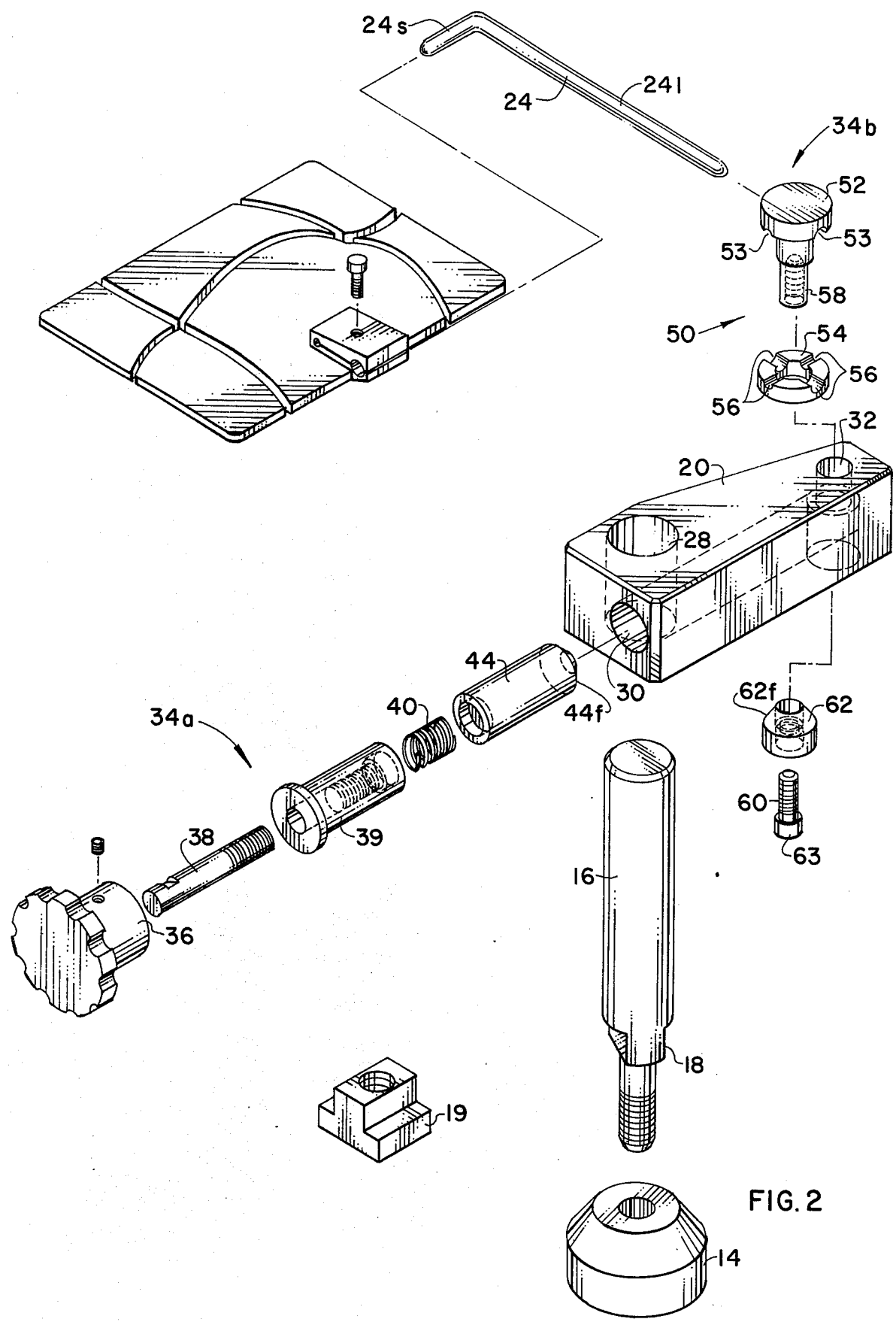
FIG. 2 is an exploded view of the apparatus shown in FIG. 1.

Referring to FIGS. 2 and 3, it is seen that housing 20 comprises three bores: a first vertical bore 28, a horizontal bore 30, and a second vertical bore 32. It will be observed that bore 30 partially intersects bore 28, thereby forming a common segment through which post 16 passes. Bore 30 also proceeds through housing 20 to intersect with second vertical bore 32. The clamp-actuating mechanism is divided into two parts: a horizontally-movable assembly 34a and a vertically-movable assembly 34b.

Figure 4:
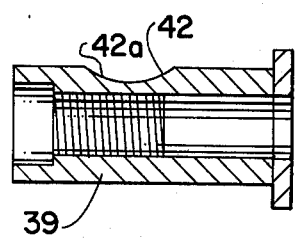
FIG. 4 is an elevation of a clamp member used in the apparatus of the invention.
Figure 5:
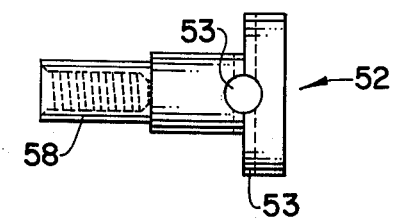
FIG. 5 is a plan view of a clamp member used in the invention.

Assembly 34a is comprised of a knob 36, a locking screw 38 adapted for turning with knob 36, a hollow post-clamp member 39 (seen in more detail in FIG. 4) through which screw 38 passes (and to which the screw is threaded), a spring 40 through which screw 38 passes, a tubular cam-bearing member 44 adapted to be pushed in a horizontal direction by screw actuator 38. As seen in FIG. 4, the post clamp member 39 comprises a cut-out segment 42 through which post 16 passes with considerable clearance. When assembly 34a is in the adjust mode, snug contact is maintained between the surface 42a of cutout segment 42 and post 16 by means of spring 40 which biases post clamp 39 backwardly towards knob 36 and into snug, contact with post 16. The contact is sufficiently snug to avoid gravity-induced movement, but not too tight to yield readily to hand pressure. At the same time, spring 40 biases cam member 44 to the right pushing the cam into a snug relationship with the vertically movable clamping assembly 34b.

Figure 8:
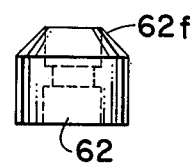
FIG. 8 is an elevation of one cam-bearing member of the invention.
Figures 6, 7:
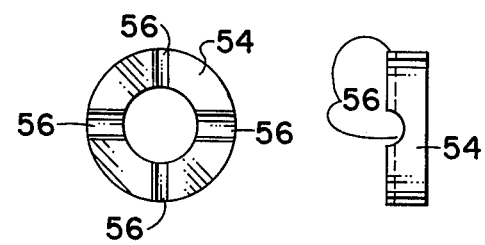
FIGS. 6 and 7 show a plan view and an elevation of a clamp-forming member used in the invention.

Assembly 34b, the parts of which are seen in more detail in FIGS. 5–8, comprises clamp means 22, a vertical clamping means 50 comprising a stem mounted upper clamp member 52 and a lower clamp member 54 fitted loosely over stem 58 of member 52. Member 52 and 54 comprise channels 56 for receiving L-shaped rod 24. Rod 24 passes through either of two perpendicular bores 53 in member 52. Stem 58 of clamp member 52 is threaded to receive a screw 60, and also mounted on said screw 60, beneath member 54, is a second tubular cam-bearing member 62 which is adapted to pull downwardly on screwhead 63 which fits into member 62 as seen in FIG. 8.

Conical cam faces 62f and 44f are placed at approximately 45° angles to the axis of bore 30, thereby forming complementary faces whereby forces transmitted to one face, e.g. face 44f by tightening of screw 38, will also be transmitted to the other face e.g., face 62F. Thus, force is adapted to be transformed by a 45° angle into a vector for pushing cam 62f downwardly. When pushed downwardly, the cam pulls screw 60 and stem 58 downwardly, thereby pulling clamp member 52 snugly against clamp member 54. Clamp member 54 is, in turn, pulled tightly against housing 20. This pulling action is either relatively weak as in the adjust mode, or is relatively strong, as in the locking mode. The precise mode depends on whether pressure exerted on the interface 44f–62f is caused by spring 40 (adjust mode) or by the screw 38 (lock mode).

Similarly, the back pressure exerted by surface 42a on post 16 depends on whether such pressure is merely that required to achieve the snug pressure exerted by spring 40 or whether it is the much larger pressure achieved by overriding the spring with screw 38, thereby pulling post clamp 39 backwardly into its locking mode.

In operation, the machinist simply clamps the apparatus of the invention to the bedplate of his machine tool and manually adjusts each of the positions shown diagrammatically in FIG. 1. This adjusting, because of the pressure of spring 40 transmitted to all adjust positions, is achieved without the need for any intermediate tightening operations. When the adjusting is completed, the machinist simply turns knob 36 to simultaneously convert all clamping actions to the lock mode. Advantageously, the screw 38 is selected so that the apparatus may be locked within about a 90°-turn of the knob. Advantageously, this results in a travel of clamping member 39 of about 0.015 inch or less.

It is an advantage of the invention that L-shaped stop member 24 is particularly well adapted to hold and position auxiliary means such as the shield shown in the upper right in FIG. 2, because of the biased holding ability of clamp 22. Moreover, stop member 24 can be utilized as a support, guide or stop means where necessary. For example, a work being machined can be supported at a selected height above the bed of the machine tool on the long arm 24l of the stop member 24. The short arm 24s of the stop member 24 can be upturned and disposed contiguous to a work to act as a guide in preventing the work from deviating from its path of travel during machining. The short arm 24s can also be upturned and disposed at a selected point in the path of travel of a work during machining to act as a stop.

It is to be understood that the following claims are intended to cover all of the generic and specific features of the invention herein described and all statements of the scope of the invention which might be said to fall therebetween.

What is claimed is:

1. A work stop of the type used on machine tools to limit the movement of a workpiece, said work stop comprising
   a. a mounting post having a vertical axis;
   b. a housing mounted on said mounting post and adapted for vertical movement along said post, said housing also mounted for swinging movement about said post;
   c. a clamp means mounted on said housing and spaced apart from said mounting post, said clamp means adapted for rotation in a vertical plane parallel to the axis of said mounting post and forming clamping means in a direction parallel to said axis;
   d. biasing means mounted within said housing to hold all said parts in snug, but adjustable, predetermined positional relationship one to the other, while allowing independent manual positioning of clamp means and housing;
   e. and a single lock actuating means to override said biasing means and lock said clamp-means and housing into said predetermined relationship.

2. Apparatus as defined in claim 1 comprising an L-shaped rod in said clamp means.

3. A work stop of the type for limiting the movement of a workpiece on machine tools, said work stop comprising
   a. a housing
   b. a first vertical bore in said housing forming means to receive a mounting post;
   c. a horizontal bore and a second vertical bore together forming means to contain a clamp-actuating mechanism;
   d. said horizontal bore forming means to house a horizontally-aligned lock-actuating means, said horizontal bore partially intersecting with said first vertical bore so that a portion of cylinder defined by said first vertical bore passes through a segment of the space formed by said first vertical bore,
   e. said second vertical bore intersecting said horizontal bore and forming means to house a vertically aligned lock-actuating means, and wherein
   f. said horizontally aligned actuating means comprises
      1. an actuating screw, forming means to tighten said clamp actuating mechanism
      2. a threaded post clamp member through which said screw passes and which is pulled tightly against said post clamp by pressure exerted through said screw as it is tightened.
      3. a first cam means comprising a first cam surfce mounted at an angle of less than 90° to said horizontal bore.
      4. a second cam means mounted in said vertical bore and connected to vertical clamp-actuating mounted in said bore, said second cam forming with said first cam, means to convert horizontal force vector exerted on said first cam means by said screw to a vertical force vector on said vertical clamp-actuating means, and
   g. a biasing means positioned in said clamp-actuating mechanism, said biasing means adapted to maintain sufficient pressure on said clamp post to avoid spurious movement of said post clamp movement relative to said post when said screw and said lock actuating means, is in a retracted position.

4. Apparatus as defined in claim 3 comprising an L-shaped rod in said clamp means.

5. In a work stop of the type used on machine tools to limit the movement of a workpiece during the machining thereof and wherein said work stop comprises a housing means for positioning the height and angular position of said housing on a post; and wherein said housing carries a clamp means adapted to hold a work stop member, the improvement wherein said housing comprises a lock actuating means including
- A. a first vertical bore in said housing forming means to receive said post;
- b. a horizontal bore and second vertical bore together forming means to contain a clamp-actuating mechanism;
- C. said horizontal bore in said housing forming means to house a horizontally aligned lockactuating means, said horizontal bore partially intersecting with said first vertical bore so that a portion of a cylinder formed by said first vertical bore passes through a segment of the space formed by said vertical bore;
- D. said second vertical bore intersecting said horizontal bore and forming means to house a vertically aligned means for locking said clamp means, and wherein
- E. said horizontally aligned actuating means comprises
  1. an actuating screw
  2. a post clamp member through which said screw passes and which comprises a segmental cutout for receiving that portion of said post which is placed in said segment
  3. a first cam means comprising a first cam surface mounted at an angle to said horizontal bore;
  4. a second angular cam measn mounted in said vertical bore and connected to vertical clamp-actuating means mounted in said bore, said second cam forming with said first cam, means to convert horizontal force vector exerted on said first cam means to a vertical force vector on said vertically-aligned locking means
- F. lock-actuating means comprising screw means to pull said post clamp member into locking contact with said post and, simultaneously, force said first cam against said second cam and thereby lock said clamp means and said work stop member,
- G. and a biasing means positioned in said clamp-actuating mechanism, said biasing means adapted to maintain sufficient pressure on said clamp post to avoid spurious movement of said post clamp movement relative to said post when said lock actuating means is in a retracted position.

6. Apparatus as defined in claim 5 comprising an L-shaped rod in said clamp means.

* * * * *